(No Model.) 8 Sheets—Sheet 1.

A. W. & Z. W. DAW.
VALVE FOR ROCK DRILLS.

No. 456,801. Patented July 28, 1891.

Fig. 1.

Attest:
E. St Pury
R. E. Somes.

Inventors.
Albert W. Daw,
Zacharias W. Daw,
By F. C. Somes,
Attorney.

(No Model.) 8 Sheets—Sheet 3.

A. W. & Z. W. DAW.
VALVE FOR ROCK DRILLS.

No. 456,801. Patented July 28, 1891.

Attest:
E. De Puy
R. E. Somes.

Inventors:
A. W. Daw
Z. W. Daw
By F. C. Somes
Attorney (No Model.) 8 Sheets—Sheet 5.

A. W. & Z. W. DAW.
VALVE FOR ROCK DRILLS.

No. 456,801. Patented July 28, 1891.

Fig. 7.

Attest:
E. St. Pury
R. E. Somes.

Inventors:
A. W. Daw,
Z. W. Daw,
By F. C. Somes
Attorney (No Model.)　　　　　　　　　　　　　　　　　　8 Sheets—Sheet 6.

A. W. & Z. W. DAW.
VALVE FOR ROCK DRILLS.

No. 456,801.　　　　　　　　　　　Patented July 28, 1891.

Fig. 8.

Attest:
E. St. Puy
R. E. Somes

Inventors:
A. W. Daw
Z. W. Daw
By F. C. Somes,
Attorney.

(No Model.)  8 Sheets—Sheet 8.

A. W. & Z. W. DAW.
VALVE FOR ROCK DRILLS.

No. 456,801. Patented July 28, 1891.

Attest:
E. De Puy
R. E. Somes.

Inventors:
A. W. Daw,
Z. W. Daw,
By F. C. Somes
Attorney

UNITED STATES PATENT OFFICE.

ALBERT WILLIAMS DAW AND ZACHARIAS WILLIAMS DAW, OF LAURVIG, NORWAY.

VALVE FOR ROCK-DRILLS.

SPECIFICATION forming part of Letters Patent No. 456,801, dated July 28, 1891.

Application filed April 28, 1891. Serial No. 390,789. (No model.) Patented in England June 9, 1890, No. 8,873, and July 18, 1890, No. 11,216.

*To all whom it may concern:*

Be it known that we, ALBERT WILLIAMS DAW and ZACHARIAS WILLIAMS DAW, both subjects of the Queen of Great Britain, residing at Laurvig, in the Kingdom of Norway, have invented new and useful Improvements in and Connected with Valves for Percussive Rock-Drills, Direct-Acting Pumps, and Engines, (for which we have obtained patents in Great Britain, No. 8,873, bearing date June 9, 1890, and No. 11,216, bearing date July 18, 1890,) of which the following is a specification.

Our invention relates to improvements in air or steam moved valves, and it consists in a novel arrangement of pistons for actuating such valves, and of passages for controlling the supply and exhaust of steam or compressed air to such pistons, whereby all external connections, tappets, swellings on or hollow spaces in the main piston-rod are dispensed with, and greater simplicity and efficiency obtained. These improvements are applicable to percussive rock-drills, direct-acting pumps, and engines generally.

Our improvements as applied to a percussive rock-drill are illustrated in the accompanying drawings, in which—

Fig. 7 is a plan view of Fig. 6 with the valve-chest removed.

Like letters indicate corresponding parts throughout the drawings.

C is the cylinder with piston P and piston-rod R of ordinary construction.

P' and P² are small pistons to actuate the valve V, and which pistons work, respectively, in small cylinders C' C², formed in opposite ends of the valve-chest.

Figure 1:
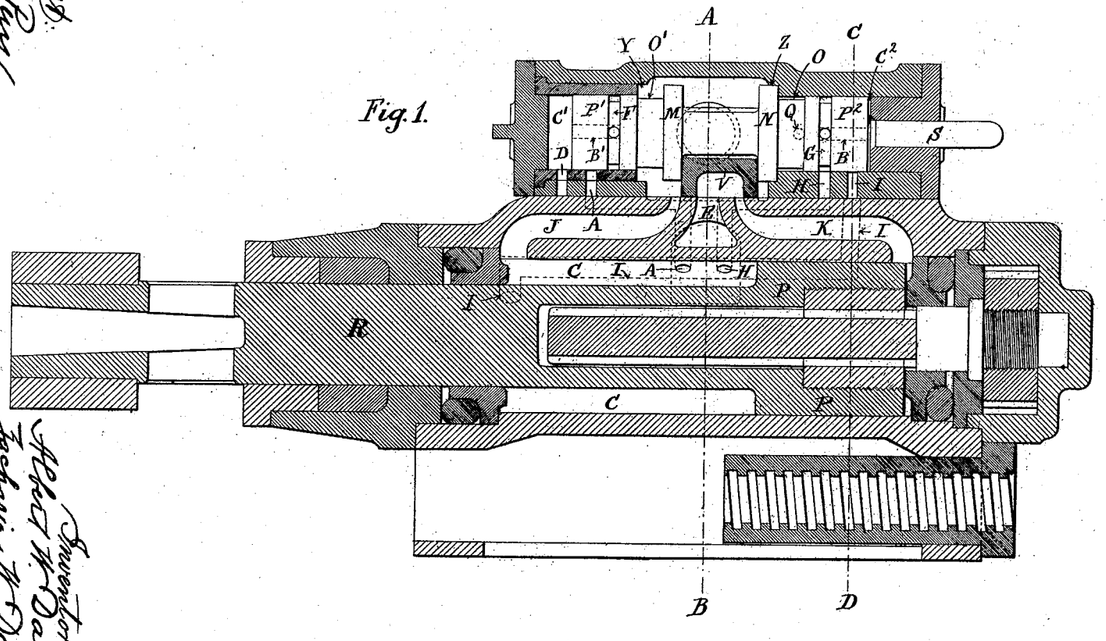
Figure 1 is a longitudinal section of a rock-drill embodying our improvements.
Figure 2:
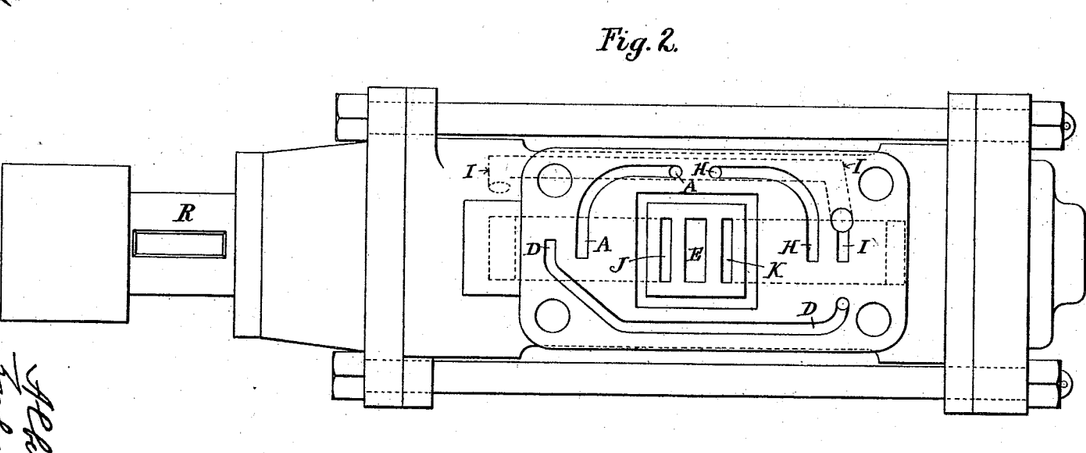
Fig. 2 is a plan view thereof with the valve-chest removed.
Figure 3:
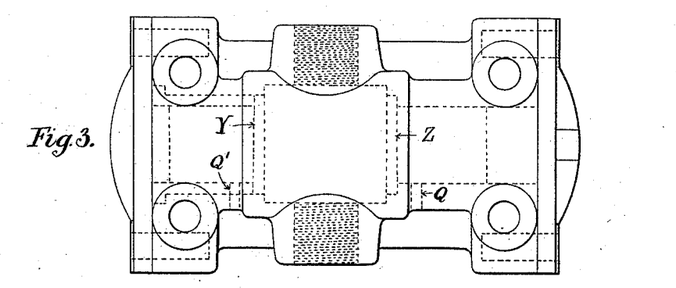
Fig. 3 is a plan view of the valve-chest.
Figure 4:
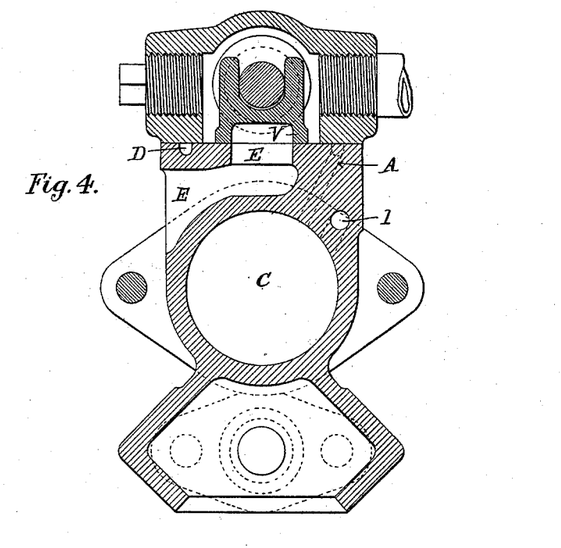
Fig. 4 is a transverse section on the line A B, Fig. 1.
Figure 5:
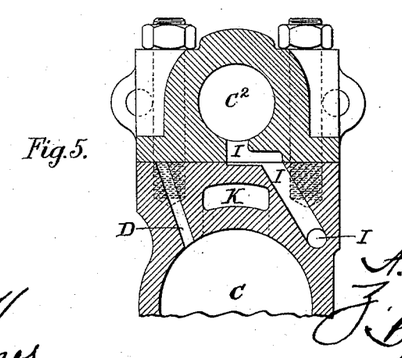
Fig. 5 is a transverse section on the line C D, Fig. 1.

Referring to Figs. 1 to 5, inclusive, of the drawings, it will be seen that in carrying out our improvements in the interior and from the rear of the small pistons P' P², which actuate the valve V, we construct the passages B' B, and connect these passages to annular grooves F and G, formed on the exterior of each valve-piston. Further, in addition to the ordinary supply ports J and K and exhaust passage E, we construct four other passages D A H I in the main cylinder C, two of which A and H through the annular grooves F and G, and passages B' and B connect the valve-piston cylinders C' and C² with the main cylinder C, while the other two passages D and I connect the said valve-piston cylinders C' and C² direct to the opposite ends of the main cylinder, respectively. The annular grooves F and G, formed on the exterior of the valve-pistons P' and P² to connect the passages B' and B, formed in the said pistons, with the passages A and H, leading to main cylinder C, are so arranged that when one of such annular grooves is open to supply from the main cylinder the other annular groove is cut off therefrom, and the passages I and D, connecting the valve-piston cylinders C² and C', in which the valve-pistons P² and P' work, with the opposite ends of the main cylinder C, respectively, are so arranged that they are alternately opened and closed by the travel of the valve-pistons P² and P', and, further, when one passage (I or D) is open to the live air or steam in the main cylinder C, the other is in communication, through the opposite end of the main cylinder, with the exhaust E.

Figure 6:
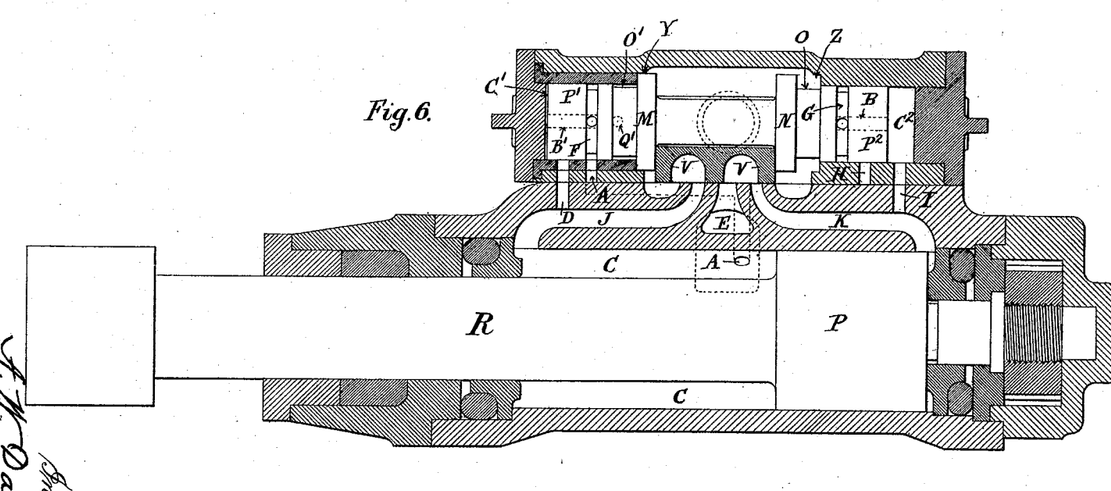
Fig. 6 is a longitudinal section of a rock-drill showing a slight modification of our invention.
Figure 8:
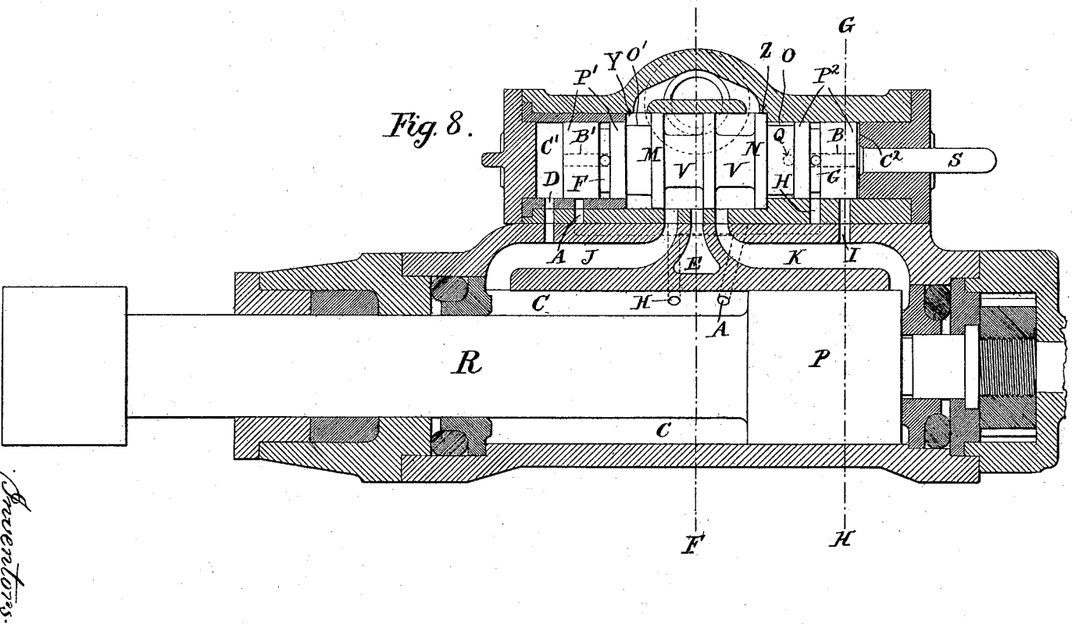
Fig. 8 is a longitudinal section of a rock-drill, showing the application of our invention to a rock-drill in which a piston-form of valve is employed.
Figure 9:
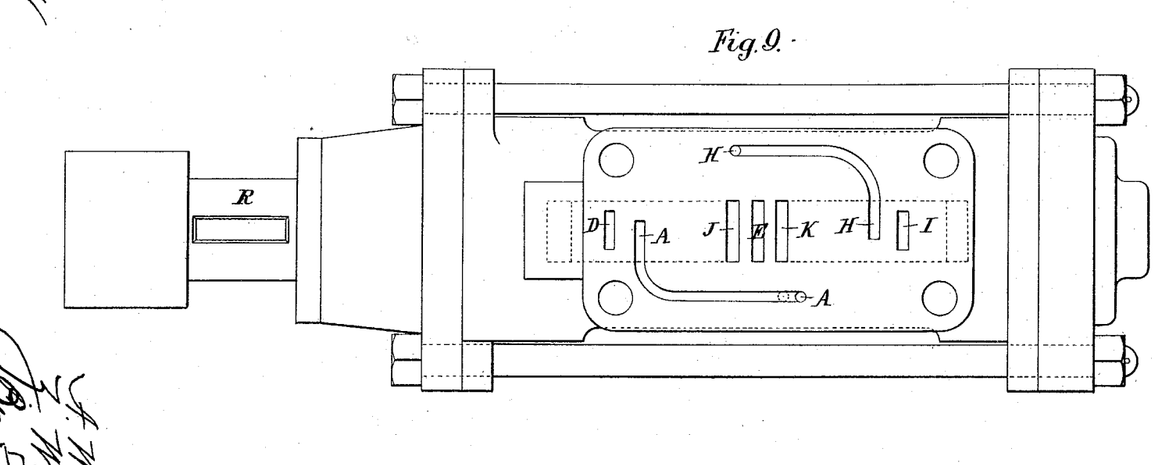
Fig. 9 is a plan view of Fig. 8 with the valve-chest removed.
Figure 10:
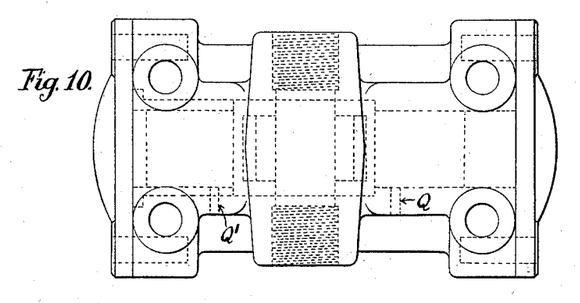
Fig. 10 is a plan view of the valve-chest shown in Fig. 8.
Figure 11:
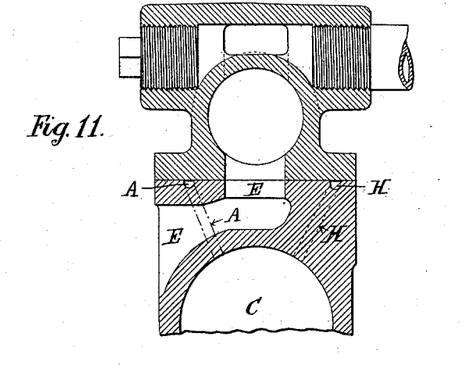
Fig. 11 is a transverse section on line E F, Fig. 8.
Figure 12:
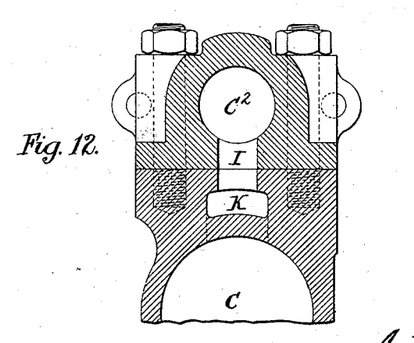
Fig. 12 is a transverse section on line G H, Fig. 8.

Instead of the passages H A and I D being arranged as above described, they may, as shown in Figs. 6 to 12, inclusive, of the drawings, be reversed—that is to say, the passages H A, proceeding from the main cylinder C, may be connected with the opposite valve-piston cylinders $C^2$ $C'$ through the annular grooves G F and passages B B' in the valve-pistons $P^2$ P', while the passages I D may be arranged to connect the valve-piston cylinders $C^2$ C', respectively, to the same end of main cylinder C either through the supply and exhaust ports K J, as shown, or by independent passages. The valve-piston cylinders C' $C^2$ are each provided with another passage Q' Q, which is permanently open to exhaust, and which passages may be used either in addition to the four passages D A H I or in place of the passages D I, the passages A H, which are retained, being arranged so as to connect each valve-piston cylinder either to the opposite end of the main cylinder or to the same end thereof.

In addition to the valve-pistons P' $P^2$ for controlling the passages leading from the valve-piston cylinders C' $C^2$, in which said pistons P' $P^2$ work, to the main cylinder, we construct two additional pistons M and N of larger diameter, which pistons form one with the valve-pistons P' and $P^2$, and it is between these supplemental pistons M and N that the valve V, for controlling the supply and exhaust to and from the main cylinder C, is carried. Annular grooves O' O are formed between each of the supplemental pistons M and N and the valve-pistons P' and $P^2$, respectively, and each of the pistons M and N works in conjunction with one of two auxiliary cylinders Y and Z, opening into the valve-chest; but when one of the pistons M or N enters its cylinder such cylinder is cut off therefrom and the annular grooves O' O and the additional ports or passages Q' Q, provided in the valve-piston cylinders and which are permanently open to exhaust, place the rear of such supplemental piston directly open to exhaust, while when the piston has left its cylinder the live air or steam in the valve-chest acts upon the rear of such piston and forces the other supplemental piston into its cylinder and firmly against the end thereof, and thus prevents all movement or fluttering of the valve-pistons and valve, such supplemental cylinder being then directly open to exhaust through its additional passage Q' or Q and the annular groove O' or O above referred to. Before the supplemental piston leaves its cylinder the additional passage Q' or Q has been previously closed by the valve-piston P' or $P^2$, so that the live air or steam cannot pass from the valve-chest to the additional passage which is open to exhaust. Further, when either of the supplemental pistons M or N has left its cylinder Y or Z, the annular grooves F or G, formed in the valve-pistons P' $P^2$, (and which said annular grooves F G communicate, respectively, by passages B' and B, formed in the said valve-pistons P' $P^2$, with the rear end of the cylinders C' $C^2$, in which such valve-pistons P' $P^2$ work,) are brought alternately over the additional ports or passages Q' Q, so that the rear of the valve-piston P' and $P^2$ are thus kept open to exhaust through such additional passages.

Referring to Figs. 1 to 5, inclusive, it will be seen that the action is as follows: The piston P having arrived at its full backward stroke, air or steam is admitted from the main cylinder C through passage H, annular groove G, and passage B to the rear of valve-piston $P^2$ and causes the forward movement of the pistons $P^2$ N N P'. In its travel piston $P^2$ covers passage H and uncovers passage I, connecting the lower end of main cylinder C and valve-piston cylinder $C^2$, thus maintaining full pressure of air or steam in the valve-cylinder $C^2$. Then supplemental piston N emerges from its cylinder Z, and piston M enters its cylinder Y, while annular groove O' is brought into communication with passage Q', which passage is always open to exhaust, and the complete exhaust of auxiliary cylinder Y insured through it and the said annular groove O'. Now as the rear side of supplemental piston M is open to exhaust and the rear side of supplemental piston N exposed to the live air or steam in the valve-chest, the valve-pistons and valve are impelled forward by the pressure on piston N until piston M is forced against the end face of cylinder Y, where it is firmly held by the pressure of live air or steam in the valve-chest against the rear of piston N. During this movement the valve-cylinder C' was at first freely open to exhaust through passage D, port K, and exhaust E, and also through passage Q' in the valve-chest, until these passages were shut off by the travel of the piston P'. Then annular groove F opens to passage A and communication with the main cylinder C and exhaust E thus kept, for at the same time the movement of the valve V will have put the space below the piston P open to exhaust through passages J and E. When annular groove F reaches passage A, valve-cylinders $C^2$ and C' are both open to the same (the lower) end of the main cylinder C, the former through passage I and the latter through passage B', annular groove F, and passage A, whereby the pressures on the rear of the valve-pistons $P^2$ and P' are brought into equilibrium, when the remaining travel of the valve is effected by the pressure on the rear of supplemental piston N, as above described. Before supplemental piston N left auxiliary cylinder Z the exhaust-port Q was closed by the valve-piston $P^2$, so that live air or steam cannot pass from the valve-chest to the exhaust-passage Q, and, further, the annular groove G, through the travel of the valve-pistons, has been brought opposite the exhaust-passage Q and the rear of valve-piston cylinder $C^2$, thus put open to exhaust through passage B, annular groove G, and said passage Q. The valve V will now have uncovered port K, so that steam or air in the valve-chest will pass to the rear of main piston P and effect the forward stroke. On the completion of the full forward stroke passage A is opened to the live air or steam in the main cylinder, which flows through such passage, annular groove F, and passage B′ to the rear of piston P′, the rear of piston P² being freely open to exhaust 1 through passage B, annular groove G, and passage Q, and 2 through passage I, connecting valve-cylinder C² with the lower end of main cylinder C, port J, and exhaust E. Now the area of said piston P′ is made greater than the exposed area of the supplemental piston N, (any desired difference in area can be given,) which, by the pressure of the live air or steam in the valve-chest against it, keeps the supplemental piston M firmly against the end of cylinder Y, so that the pressure on piston N is overcome and pistons P′, M, N, and P² and valve V are caused to move backward. In its travel piston P′ now covers passage A and uncovers passage D, connecting cylinder C′ with the top end of the main cylinder, thereby maintaining full pressure of air or steam in the valve-piston cylinder C′. Then supplemental piston M emerges from its auxiliary cylinder Y, exhaust-passage Q′ being closed by the travel of the piston P′, so that live air or steam cannot pass from the valve-chest to passage Q′, and supplemental piston N enters its auxiliary cylinder Z, which cylinder is now open to exhaust through annular groove O, having been brought into communication with exhaust-passage Q. Now, in the same manner as piston M on the forward stroke was forced against the end of its cylinder Y piston N is forced firmly against the end of its cylinder Z by the pressure of live air or steam in the valve-chest against the rear of piston M and by the pressure of the air or steam in cylinder C′ until the pressure of air or steam in both cylinders C′ and C² is brought into equilibrium by annular groove G coming opposite passage H. At the same time the movement of the valve V will have put the space above the main piston P open to exhaust through the passages K and E and uncovered port J, so that air or steam in the valve-chest will pass to the under side of piston P, and so effect the backward stroke when the action is repeated, as described. The action will be the same if the passages D A H I are reversed, as shown in Figs. 6 to 12, inclusive, of the drawings. If the passages D and I are abolished, the only difference in the action will be that the supply of steam or air from the main cylinder C to the valve-piston cylinders C′ C² will be wholly through the passages A and H, while such valve-piston cylinders will be opened to exhaust at the required times only through passage B′ or B and annular groove F or G in the valve-pistons P′ and P² when such groove F or G communicates either with the permanent exhaust port Q′ or Q, or with the passage A or H when the point at which the latter enters the main cylinder is (from the position of valve V and of the piston P in main cylinder C) in communication with the main exhaust E. A rod S, projecting through one end of the valve-chest, is provided to enable the valve to be pushed over when necessary in starting the engine.

What we claim as our invention, and desire to secure by Letters Patent, is—

1. In a percussive rock-drill or other reciprocating motor, the combination of a main cylinder C, with a piston P reciprocating therein, a valve-chest with cylinders C′ C² formed therein, and in which work pistons P′ P² for actuating the valve V, controlling the supply and exhaust passages J and K and the exhaust-passage E of the main cylinder C, passages A H, connecting each of the valve-piston cylinders C′ C², respectively, either with the same end or with the opposite end of main cylinder C, such passages being controlled by the reciprocation of piston P in cylinder C, passages Q′ Q, formed in the valve-piston cylinders C′ C² and permanently open to exhaust, and passages B′ B, formed in the valve-pistons P′ P² and leading from the rear thereof to a point in their periphery intermediate of their length, such passages acting in conjunction with the passages A H and the passages Q′ Q, all substantially as and for the purposes specified.

2. The combination of a main cylinder C, with a piston P reciprocating therein, a valve-chest having cylinders C′ C² formed therein, and in which work pistons P′ P² for actuating the valve V, controlling the supply and exhaust passages J and K and the exhaust-passage E of the main cylinder C, passages D A H I, controlled by the valve-pistons P′ P² and connecting each of the valve-piston cylinders C′ C², respectively, with the same end of and with the opposite end of main cylinder C, the passages A H being controlled by the reciprocation of the main piston P in the main cylinder and the passages D I serving for both the supply and exhaust of the valve-piston cylinders C′ C², passages Q′ Q, formed in the valve-piston cylinders C′ C² and permanently open to exhaust, and passages B′ B, formed in the valve-pistons P′ P² and leading from the rear thereof to a point in their periphery intermediate of their length, such passages B′ B acting in conjunction with the passages A H and the passages Q′ Q, all substantially as and for the purposes specified.

3. The combination of a main cylinder C, with a piston P reciprocating therein, cylinders C′ C², formed in the valve-chest, and in which work pinions P′ P², cylinders Y Z, also formed in the valve-chest and opening into same, and in which work pistons M and N, carrying between them the valve V for controlling the supply and exhaust passages J and K and the exhaust-passage E of the main cylinder C, such pistons M and N being connected, respectively, to the pistons P′ and P² by a part of less diameter than the latter, passages A H, connecting each of the valve-piston cylinders C′ C², respectively, either with the same end of or with the opposite end of main cylinder C, such passages being controlled by the reciprocation of the main piston P in the main cylinder, passages B' B, formed in the valve-pistons P' P² and leading from the rear thereof to a point in their periphery intermediate of their length, such passages acting in conjunction with the passages A H, and passages Q' Q, formed in the valve-piston cylinders C' C² and permanently open to exhaust, these passages being controlled by pistons P' P² and situated so as to communicate with the groove or part of reduced diameter connecting the pistons P' P² with pistons M N, respectively, when the latter are within their cylinders Y Z, all substantially as and for the purposes specified.

4. The combination of a main cylinder C, with a piston P reciprocating therein, cylinders C' C², formed in the valve-chest, and in which work pistons P' P², cylinders Y Z, also formed in the valve-chest and opening into same, and in which work pistons M and N, carrying between them the valve V for controlling the supply and exhaust passages J and K and the exhaust-passage E of the main cylinder C, such pistons M and N being connected, respectively, to the pistons P' and P² by a part of less diameter than the latter, passages D A H I, controlled by the valve-pistons P' P² and connecting each of the valve-piston cylinders C' C², respectively, with the same end of and with the opposite end of the main cylinder C, the passages A H being controlled by the reciprocation of the main piston P in such main cylinder, and the passages D I serving for both the supply and exhaust of the valve-piston cylinders C' C², passages B' B, formed in the valve-pistons P' P² and leading from the rear thereof to a point in their periphery intermediate of their length, such passages acting in conjunction with the passages A H, and passages Q' Q, formed in the valve-piston cylinders C' C² and permanently open to exhaust, these passages being controlled by pistons P' P² and situated so as to communicate with the groove or part of reduced diameter, connecting the pistons P' P² with pistons M N, respectively, when the latter are within their cylinders Y Z, all substantially as and for the purposes specified.

5. The combination of a main cylinder C, with a piston P reciprocating therein, cylinders C' C², formed in the valve-chest, and in which work pistons P' P², cylinders Y Z, also formed in the valve-chest and opening into same, and in which work pistons M and N, carrying between them the valve V for controlling the supply and exhaust passages J and K and the exhaust-passage E of the main cylinder C, such pistons M and N being connected, respectively, to the pistons P' and P² by a part of less diameter than the latter, passages A H, connecting each of the valve-piston cylinders C' C², respectively, either with the same end of or with the opposite end of main cylinder C, such passages being controlled by the reciprocation of the main piston P in the main cylinder, passages Q' Q, formed in the valve-piston cylinders C' C² and permanently open to exhaust and situated so as to communicate with the groove or part of reduced diameter connecting the pistons P' P² with pistons M N, respectively, when the latter are within their cylinders Y Z, but to be shut off therefrom by the pistons P' P² when such pistons M N are not within their cylinders, and passages B' B, formed in the valve-pistons P' P² and leading from the rear thereof to a point in their periphery intermediate of their length, such passages acting in conjunction with the passages A H and also with the passages Q' Q, all substantially as and for the purposes specified.

6. The combination of a main cylinder C, with a piston P reciprocating therein, cylinders C' C², formed in the valve-chest, and in which work pistons P' P², cylinders Y Z, also formed in the valve-chest and opening into same, and in which work pistons M and N, carrying between them the valve V for controlling the supply and exhaust passages J and K and the exhaust-passage E of the main cylinder C, such pistons M and N being connected, respectively, to the pistons P' and P² by a part of less diameter than the latter, passages D A H I, controlled by the valve-pistons P' P², and connecting each of the valve-piston cylinders C' C², respectively, with the same end of and with the opposite end of the main cylinder C, the passages A H being controlled by the reciprocation of the main piston P in such main cylinder and the passages D I serving for both the supply and exhaust of the valve-piston cylinders C' C², passages Q' Q, formed in the valve-piston cylinders C' C², and permanently open to exhaust and situated so as to communicate with the groove or part of reduced diameter connecting the pistons P' P² with pistons M N, respectively, when the latter are within their cylinders Y Z, but so as to be shut off therefrom by the pistons P' P² when such pistons M N are not within their cylinders, and passages B' B, formed in the valve-pistons P' P² and leading from the rear thereof to a point in their periphery intermediate of their length, such passages acting in conjunction with the passages A H and also with the passages Q' Q, all substantially as and for the purposes specified.

ALBERT WILLIAMS DAW.
ZACHARIAS WILLIAMS DAW.

Witnesses:
CHAS. A. ALLISON,
HARRY A. MCLELLAN.